(12) United States Patent
Banisadr et al.

(10) Patent No.: US 10,866,844 B2
(45) Date of Patent: Dec. 15, 2020

(54) EVENT DOMAINS

(71) Applicant: MICROSOFT TECHNOLOGY LICENSING, LLC, Redmond, WA (US)

(72) Inventors: Bahram Banisadr, Seattle, WA (US); Jayaraman Kalyana Sundaram, Redmond, WA (US); Venkata Raja Gopal Ravipati, Redmond, WA (US); Ashraf Hamad, Woodinville, WA (US); Cesar Martin Ruiz-Meraz, Bothell, WA (US); Hitesh Madan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/146,928

(22) Filed: Sep. 28, 2018

(65) Prior Publication Data

US 2019/0340041 A1     Nov. 7, 2019

Related U.S. Application Data

(60) Provisional application No. 62/667,331, filed on May 4, 2018.

(51) Int. Cl.
    *G06F 9/54*            (2006.01)
    *H04L 29/08*        (2006.01)
    (Continued)

(52) U.S. Cl.
    CPC ............ *G06F 9/542* (2013.01); *G06F 16/958* (2019.01); *G06F 16/9535* (2019.01); *H04L 67/26* (2013.01)

(58) Field of Classification Search
    CPC ...................................................... G06F 9/542
    See application file for complete search history.

(56) References Cited

U.S. PATENT DOCUMENTS

| 2006/0146991 | A1* | 7/2006 | Thompson | .............. G06F 9/542 379/67.1 |
| 2015/0199903 | A1* | 7/2015 | Cuomo | ............... G06F 16/9537 340/905 |

(Continued)

FOREIGN PATENT DOCUMENTS

GB          2520514 A      5/2015

OTHER PUBLICATIONS

"International Search Report and Written Opinion Issued in PCT Application No. PCT/US2019/029511", dated Jul. 3, 2019, 11 Pages. (MS# 404496-WO-PCT).

*Primary Examiner* — Suraj M Joshi
(74) *Attorney, Agent, or Firm* — Workman Nydegger

(57) ABSTRACT

Publishing events. A method includes a publisher sending a message comprising one or more events to a domain. The domain is a container comprising a group of domain topics. Each domain topic in the domain is relevant by subject matter to the one or more events by virtue of belonging to the container. The method further includes, at the domain determining the appropriate domain topics from the group of domain topics for each event in the one or more events. The method further includes identifying subscribers to the appropriate domain topics. The method further includes sending notifications to the subscribers of the domain topics of the one or more events.

20 Claims, 5 Drawing Sheets

(51) Int. Cl.
*G06F 16/958* (2019.01)
*G06F 16/9535* (2019.01)

(56) References Cited

U.S. PATENT DOCUMENTS

2017/0244657 A1* 8/2017 Baldwin ................. H04L 51/12
2017/0244783 A1* 8/2017 Maresca ............... H04L 67/104

* cited by examiner

EVENT DOMAINS

CROSS-REFERENCE TO RELATED APPLICATIONS

This application claims the benefit of and priority to U.S. Provisional Patent Application Ser. No. 62/667,331 filed on May 4, 2018 and entitled "EVENT DOMAINS," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Various computing system components issue events when certain things occur. These events are used by other computing system components for a number of different reasons. For example, the other computing system components may document the events for use in analytics. Alternatively or additionally, computing system components may use the events to trigger additional computing. Often, multiple different computing system components will want to be aware of a single event or series of events from another single computing system component. For example, consider a case where a new employee is added to an employee database. This may generate an event indicating the addition of the new employee. A human resources system may want to be aware of this event to document the new employee. An insurance system component may want to be aware of the event to ensure that the new employee is signed up for insurance. An IT system component may want to be aware of the event to ensure that IT resources are provisioned for the new employee, and so forth.

Computing systems exist to facilitate this functionality. One such computing system is Azure Event Grid available from Microsoft Corporation of Redmond, Wash. In particular, a publisher of events may be configured to publish events through Secure Hypertext Transfer Protocol (HTTPS) or Advanced Message Queuing Protocol (AMQP) to so-called "topics". For example, in the example illustrated above, the topic may be "employee". Events for new employees, employees being terminated, and the like, may be issued to the topic. Different computing systems that are interested in a particular event can subscribe to the relevant topic to receive event notifications when an event is published to the topic. For example, relevant computing system components may subscribe to an "employee" topic which causes them to receive event notifications when an "employee" event is published to the new employee topic by a publisher. To publish events, the publisher may use a Shared Access Signature (SAS) token to authenticate and identify themselves to a particular topic using a secure protocol.

These types of systems can become very complicated in a multitenant and/or multi-customer environment. For example, consider the case where an event publisher is an insurance broker having multiple different insurance companies as customers. Each of those customers may have several different systems that are interested in receiving notifications about certain events. Additionally, it is desirable to maintain isolation boundaries between different customers so that one customer is not able to receive events intended for a different customer. This creates a number of complexities with respect to the publisher authenticating to various topics each time an event needs to be issued to a topic for a particular customer. Additionally, a publisher will need to make multiple requests (e.g., https or AMPQP 1.0 requests), one for each topic, for each customer.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for publishing events. The method includes a publisher sending a message comprising one or more events to a domain. The domain is a container comprising a group of domain topics. Each domain topic in the domain is relevant by subject matter to the one or more events by virtue of belonging to the container. The method further includes, at the domain determining the appropriate domain topics from the group of domain topics for each event in the one or more events. The method further includes identifying subscribers to the appropriate domain topics. The method further includes sending notifications to the subscribers of the domain topics of the one or more events.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to creating a so-called "domain" where a publisher services multiple sub-entities (e.g. customers or tenants). A domain is the entity to which events corresponding to the multiple sub-entities can be published. Rather than publishing an event to a topic created for a sub-entity, the publisher can publish an event (or even more efficiently, a batch of events) to a domain where the domain has a same subject matter, rather than individual topics having a subject matter. Domain topics for individual sub-entities can be included in the domain, but each domain topic is for a sub-entity (or other entity), and not necessarily for a subject matter. A single batch of events included in a single message can have events for different domain topics. Additionally or alternatively, a single batch of events included in a single message can be sent using a single authentication, such as by using a single SAS token, even though the single message includes events for several different domain topics.

Thus, for example, previously, a publisher would publish an event to a stand-alone topic that was created for a particular sub-entity. For example, using the example illustrated above, an insurance broker could create a topic for "policy" for events related to creating and cancelling insurance policies, where the topic would be for use by a particular customer of the insurance broker (i.e., the sub-entity). Different "policy" topics would be created for each customer, and the publisher would need to publish events to each topic individually using separate messaging and authentication. Computing components associated with the customer could subscribe to the topic to receive notifications when the publisher published events to the topic. Such systems required the publisher to authenticate to the topic using authentication tokens particular to that topic and to only publish events for that topic to that topic. This resulted in an inefficient system that required the maintenance of multiple credentials, one for each sub-entity, the need to authenticate to the various topics for the various sub-entities, and the need for multiple different message for the various topics.

Figure 1:
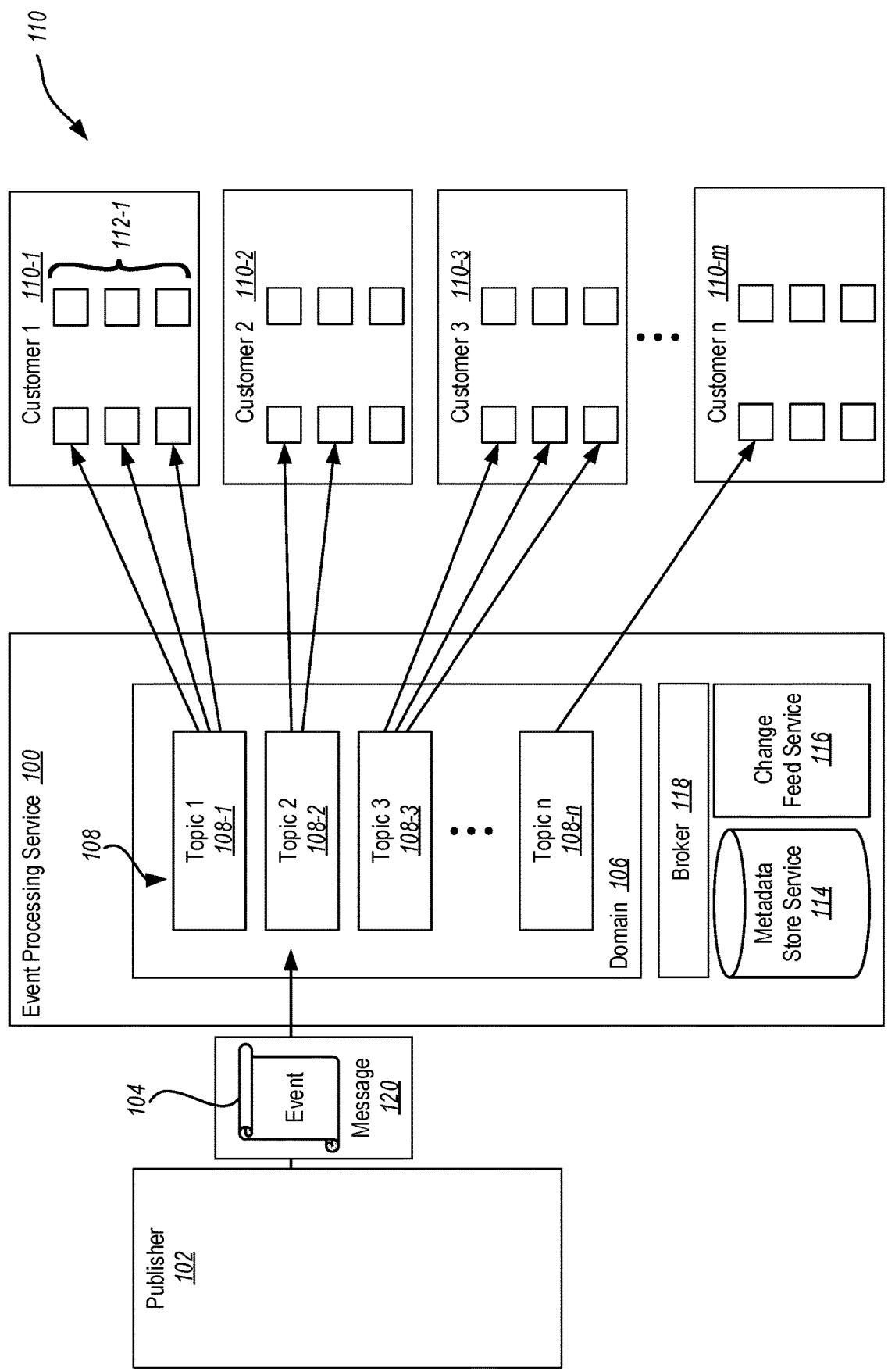
FIG. 1 illustrates a system for publishing events to subscribers.

In contrast, as illustrated in FIG. 1, a publisher 102 publishes an event 104 to a domain 106. The domain 106 is part of an event processing service 100 that ingests and processes large volumes of events and data on behalf of multiple sub-entities. The domain 106 has, or is associated with, computing components (such as processors, memory, transmission lines, mass storage, network hardware, etc.) that are able to process and route data to various other computing components. The event processing service may be, for example, an extension of Azure Event Grid, available from Microsoft, Corporation of Redmond, Wash.

In this example, a domain 106 is an entity that has an assigned subject matter. For example, using the running example illustrated herein, the domain may have the subject matter of "policy" indicating that an event 104 related to generation of a new insurance policy or termination of an existing insurance policy should be issued to the domain 106. The domain 106 includes a set 108 of domain topics. In the illustrated example the domain 106 includes domain topics 108-1, 108-2, 108-3, through 108-n, indicating that a variable number of domain topics may be implemented in the domain 106.

The publisher 102 will publish relevant events to the domain 106. In some embodiments, the publisher 102 will publish events using HTTPS or AMQP 1.0. The choice to use AMQP or HTTPS is specific to the usage scenario. AMQP requires the establishment of a persistent bidirectional socket in addition to transport level security (TLS) or SSL/TLS. AMQP has higher network costs when initializing the session, however HTTPS requires additional SSL overhead for every request. AMQP has higher performance for frequent publishers.

In some embodiments, the publisher 102 publishes events using a SAS token, or other appropriate token, to identify itself to the domain 106. SAS keys are available at the domain level. SAS tokens can be constructed either scoped to an individual domain topic or for an entire domain. The domain scoped SAS key can be used to publish events to multiple domain topics under a domain. Domain topic scoped tokens can be used for a specific domain topic. A SAS token is generated from a SAS key and is an SHA hash of a URL to the domain 106, encoded in a specific format. Using the name of the key (policy) and the token, the event processing service 100 can regenerate the hash and thus authenticate the sender. Normally, SAS tokens for event publishers are created with only send privileges on a specific event processing service. This SAS token URL mechanism is the basis for publisher identification introduced in the publisher policy below.

The event processing service enables granular control over event publishers through publisher policies. Publisher policies are run-time features designed to facilitate large numbers of independent event publishers. With publisher policies, each publisher uses its own unique identifier when publishing events to an event processing service. Publisher names do not need to be created ahead of time, but they match the SAS token used when publishing an event, to ensure independent publisher identities.

The publisher 102 can be a specially implemented publisher designed and implemented according to some predefined design that correlates with the design of the event processing service 100. For example, the event service 100 may provide various client libraries and classes for publishing events to the event service 100 from specially defined and/or designed clients. However, in other embodiments, embodiments may allow for any appropriate client to be used, for example any AMQP 1.0 client, such as Apache Qpid.

Events can be published by the publisher 102 individually or as a set of batched events.

A domain captures tenant level domain topics in the multi-tenant scenario. A domain topic, in some embodiments, is an "auto-managed" resource with a lifetime that is based on the number of event subscriptions to it. It is created when a subscriber is interested in a domain topic that does not yet exist. In some auto-managed implementations, there are no CRUD operations supported for this resource type.

The domain topics in the domain 106 will generally not be related to a particular subject matter, in and of themselves, apart from being in the domain 106, which is for a particular subject matter. Rather, each of the domain topics will be associated with a sub-entity. In particular, FIG. 1 illustrates a set 110 of sub-entities including sub-entity 110-1, 110-2, 110-3, through 110-m. The sub-entities are entities that are authorized to subscribe to domain topics in the domain 106. However, a sub-entity may only be able to subscribe to a particular domain topic (or particular domain topics) but may not be able to subscribe to other domain topics in the domain 106. Generally, a given sub-entity will have the ability to subscribe to a corresponding domain topic in the domain 106 while being prevented from subscribing from other domain topics in the domain 106. In the running example illustrated herein, a customer of an insurance broker may be able to subscribe to the domain topic for the particular customer in the domain. Thus, for example, if the publisher 102 is part of the insurance broker, and a domain 106 for "policies" is created, then the insurance broker will include a domain topic in the set of domain topics 108 for each of the customers of the insurance broker. Each of the customers is one of the sub-entities in the set 110 of sub-entities. Computing components such as computing components 112-1 for the sub-entity 110-1, are able to subscribe to the domain topic 108-1, where the domain topic 108-1 is configured to allow computing components from the sub-entity 110-1 to subscribe to the domain topic 108-1. In some embodiments, the sub-entity 110-1 will be prevented from subscribing to the domain topic 108-2, as the domain topic 108-2 is particular to a different sub-entity, namely sub-entity 110-2.

Sub-entities can be enabled to subscribe to a domain topic by providing authorization to them to create event subscriptions at the scope of that particular domain topic. If the appropriate authorization has not been enabled for a particular domain topic, a sub-entity will not be able to create a subscription to that domain topic. Thus, a customer may be provided with authorization that allows only that customer's computing components to subscribe to appropriate, relevant, and/or allowed domain topics.

Some embodiments of the event processing service 100 support the ability to create an event subscription for computing components of a sub-entity at the scope of a domain topic. When a new event subscription is created for a computing component at the scope of this domain topic, the event processing service 100 internally creates a corresponding domain topic, if one does not already exist. Similarly, when the last event subscription at the scope of a domain topic is deleted, the domain topic is deleted as well. In addition to the auto-managed domain topics, the ability to explicitly create and manage domain topics can is supported in some embodiments.

In some embodiments, domain topics auto-created under a domain will not be addressable. Hence, for such domain topics, a DNS endpoint will not be generated and authorization keys will not be generated.

An event processing service domain can be moved from one resource group to another resource group or to another subscription. The domain topics under the domain move along with the domain. Embodiments include functionality for updating the appropriate metadata for the domain/domain topics to facilitate this functionality. Some embodiments may further include functionality for moving domain topics under a domain to a different domain.

In the example illustrated in FIG. 1, the publisher 102 only needs to authenticate to the domain 106. The domain 106 includes appropriate routing and controls to ensure isolation of the various domain topics in the domain 106. That is, the domain 106 will ensure that notifications from a given domain topic will not be sent to entities that are not allowed to subscribe to that domain topic. Thus, for example, the domain 106 may prevent event notifications from the domain topic 108-1 from being sent to the sub-entity 110-2. As noted above, this can be accomplished with various routing actions to ensure that events are routed to appropriate domain topics and that event notifications are provided only to subscribers who are authorized to create event subscriptions at the scope of that domain topic.

When the publisher 102 publishes the event 104, the event will include certain information that allows the domain 106 to identify the proper domain topic and to cause that domain topic to emit event notifications to subscribers (e.g., computing components of a sub-entity that have subscribed to a domain topic). For example, the following illustrates a generalized event structure.

Domain Name
Event Type
Topic
Payload

The following illustrates a number of specific events types for a specific domain topic, in particular, the "policy" domain topic:

Policy
    New Policy
        Topic: topic1
            Insurance Agent: Contoso
            City: Seattle
            Policy type: 10 Year Term
            Policy number: 12345
            Insured: Bob Smith
            Beneficiary: Mary Smith
Policy
    Cancelled Policy
        Topic: topic2
            Insurance Agent: Fabrikam
            City: Salt Lake
            Policy type: Whole Life
            Policy number: 12346
            Insured: Ester Jones
            Beneficiary: Violet Newsome These are examples of events that may be issued to a "policy" domain for different domain topics in the domain, where the first event is a policy creation event directed at topic1 (e.g., for customer 1) and the second event is a policy cancellation event directed at topic2 (e.g., for customer 2). Note that while single events are illustrated here, typically, a batch of events will be provided to the domain 106 in a message 120. It should be noted that the message 120 may contain events that are related to different domain topics in the domain 106.

The following illustrates how some embodiments achieve multi-tenant publishing of events from a runtime perspective. When a domain is created, the event processing service 100 provisions a DNS endpoint and also provisions the authorization information. The domain metadata (domain endpoint, authorization information, input schema mappings, etc.) is synchronized to the runtime, for example, through a Change Feed Service 116 to a Metadata Store service 114. A broker 118 will refresh this information from the metadata store and cache it.

When a publisher publishes a batch of events to a domain endpoint, the events controller, in some embodiments, performs one or more of the following:

1. Determines the publisher name based on the domain URI (request URI).

2. Retrieves the information about the domain based on the above publisher name.

3. Authorizes the publisher using key or token based authorization.

4. Proceeds to deserialize the request content. Embodiments that support input schema mappings for domains and domain topics can deserialize each element from an event object in the input stream and then map it to the required target element of an input event. As part of this, embodiments ensure that the topic property of the input event contains either the name of the domain topic under the domain (e.g. "topic1"), or the full path to the domain topic.

Note: In some embodiments, for events published to a domain, the domain topic information must be specified explicitly. That is, a domain topic name, full path, or other indication to the domain topic must be specifically made. However, some embodiments may support events being specified at the "domain scope". For example, certain defaults may be implemented when a domain topic is not specified to route events to a default domain topic. Alternatively or additionally, embodiments could examine other payload data of the event to infer the appropriate domain topic. In some embodiments, machine learning could be implemented to facilitate determining the domain topic when the domain topic is not explicitly identified.

Figure 2:
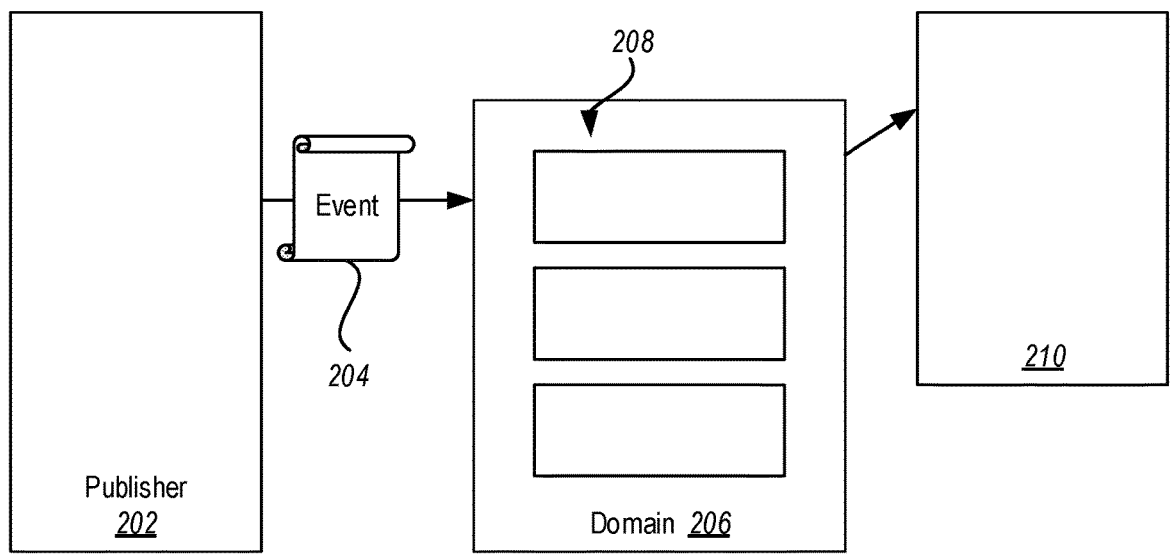
FIG. 2 illustrates an example of a system for publishing events to a subscriber of an entire domain.
Figure 4:
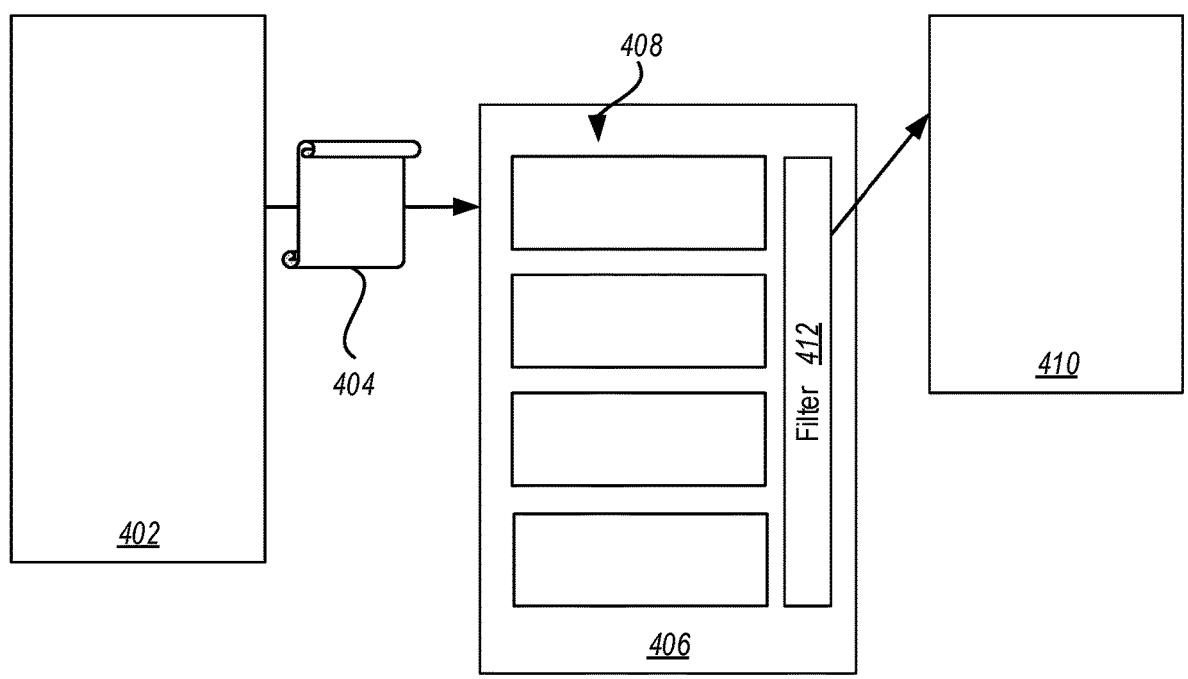
FIG. 4 illustrates an example of a system for publishing events to a subscriber of an entire domain using an event filter.

5. Potentially generates two events for each such event in the input events (to account for the case where event subscriptions could exist at domain scope (as illustrated in FIGS. 2 and 4, described in more detail below) and/or at domain topic scope (as illustrated in FIG. 1)):

A. One event will have a filtering topic set to the domain scope. As a potential optimization, some embodiments avoid generating this event if examination of the metadata can be used to determine that no event subscriptions exist at the domain scope.

B. The second event will have the filtering topic set to the domain topic scope.

6. Ensures the right billing semantics and ensures that the appropriate metrics are being reported.

FIG. 1 further illustrates a metadata store 114. The metadata store 114 may be, for example, a mass storage device. The metadata store 114 is configured to maintain metadata about domains and domain topics. The metadata store 114 is further configured to expose the right contracts to the change feed service 116 to update domains and domain topics.

The metadata store 114 is further configured to partition the domain topics appropriately.

The metadata store 114 is further configured to expose the right contracts for the broker to retrieve the metadata information about domains. This may be included as part of the publisher information.

As illustrated above, customers subscribe to appropriate domain topics by computing components for the customers subscribing to the domain topics. Thus, as illustrated in FIG. 1, portions of the computing components 112-1 subscribe to domain topic 1 108-1.

Some embodiments allow particular entities to subscribe to an entire domain or a portion of a domain. For example, attention is now directed to FIG. 2. FIG. 2 illustrates a publisher 202 that publishes an event 204 to a domain 206. The domain includes a set 208 of domain topics. In this example a subscriber 210 subscribes to the entire domain 206. This allows the subscriber 210 to be able to receive event notifications from all of the domain topics in the domain 206. For example, in the running example above of an insurance broker, the subscriber 210 may be associated with the insurance broker and may need to track every time a new insurance policy is issued or terminated by any of the customer agents of the insurance broker. By subscribing to the entire domain 206, the insurance broker can receive a notification any time any of the domain topics (each domain topic corresponding to a different customer agent) issues an event notification. In this way, the subscriber can track all of the event notifications from all of the domain topics in the domain 206.

Figure 3:
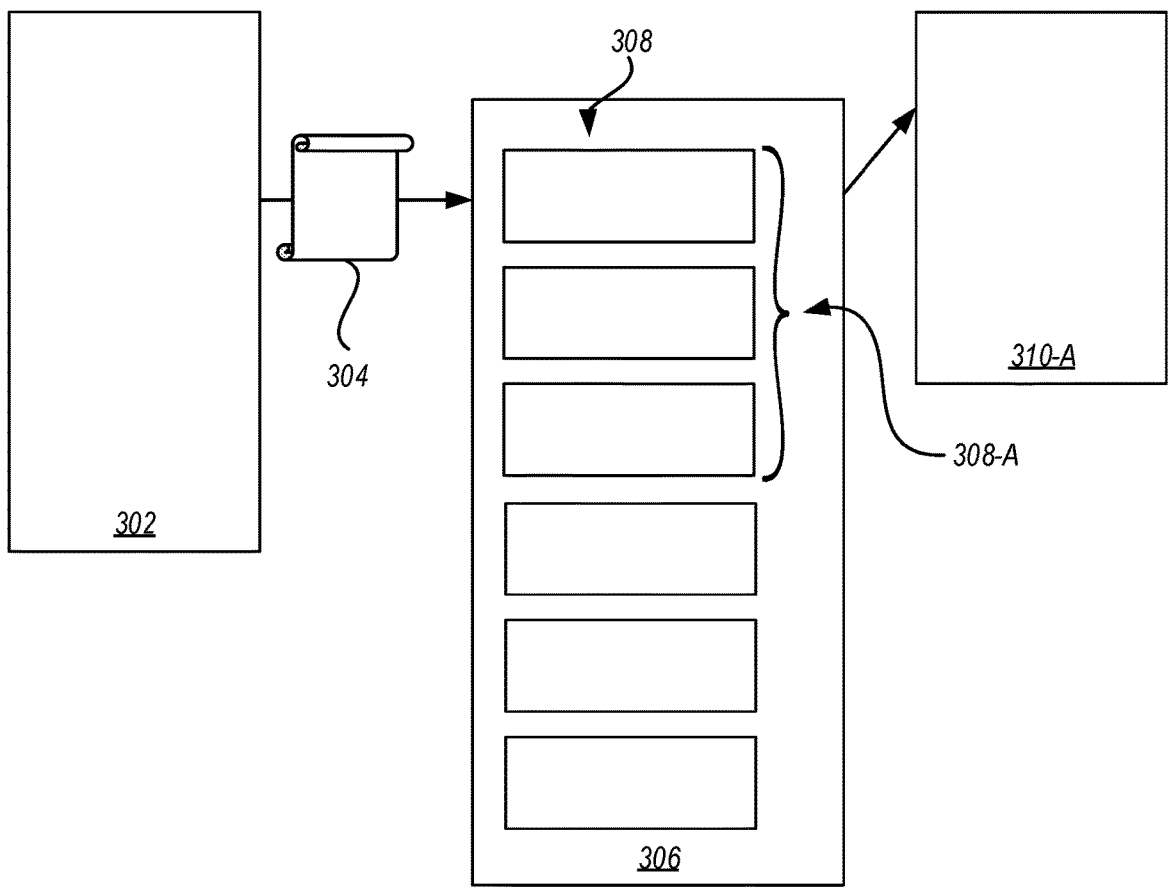
FIG. 3 illustrates an example of a system for publishing events to a subscriber of a portion of a domain.

In an alternative or additional example, a subscriber may subscribe to a portion of the domain topics in a given domain. An example of this is illustrated in FIG. 3. FIG. 3 illustrates a publisher 302 that issues an event 304 to the domain 306. In this example, the subscriber 310-A subscribes to a portion 308-A of the domain topics in the set 308 of domain topics. In particular, the subscriber 310-*a* may be only interested in the event notifications issued from a portion of the domain topics in the set 308 of domain topics. Subscribing to a portion of the domain topics may be accomplished in a number of different ways. For example, the subscriber 310-A may specify that it wishes to be notified of events from certain domain topics or groups of domain topics. For example, if the domain topics are numbered, then the subscriber 310-A may specify a range of unique identifiers correlated with domain topics. Only event notifications from domain topics having an identifier within the specified range will be provided to the subscriber 310-A. Alternatively or additionally, the subscriber 310-A could specify a domain topic name or other appropriate indication identifying domain topics from the set 308 of domain topics from which the subscriber 310-A would like to receive event notifications.

Yet another example is illustrated in FIG. 4. FIG. 4 illustrates an example where a filter is used to filter event notifications from domain topics in a domain 406. In particular, FIG. 4 illustrates that a publisher 402 publishes an event 404 to a domain 406. Publishing the event 404 to the domain 406 causes one or more domain topics in the set 408 of domain topics to issue event notifications. A subscriber 410 may have subscribed to one or more of the domain topics in the set 408 of domain topics. However, the subscriber 410 may have indicated a desire to have event notifications filtered at the domain 406. Thus, any event notifications received by the subscriber 410 will have been filtered by a filter 412 which removes (or alternatively prevents from being generated) certain event notifications. Thus, the subscriber 410 will not receive certain event notifications that have been identified by the subscriber 410 to the filter 412. For example, in some embodiments the subscriber 410 may specify that certain filtering be applied by the domain 406. For example, the subscriber 410 may specify that event notifications should be filtered by event type such that only certain types of events cause a notification to be issued from the domain 406. Thus, for example, using the running example above, the subscriber 410 may indicate that it only wishes to receive events related to insurance policy creation, but does not wish to receive any events related to insurance policy cancellation. Filtering can be applied by the filter 412 to prevent notifications regarding policy cancellations from being issued to the subscriber 410. As noted above, this may be accomplished by preventing such notifications from being generated. Alternatively, or additionally, this may be accomplished by filtering out in the event notifications regarding policy cancellation that have already been generated to prevent event notifications from being issued to the subscriber 410.

Figure 5:
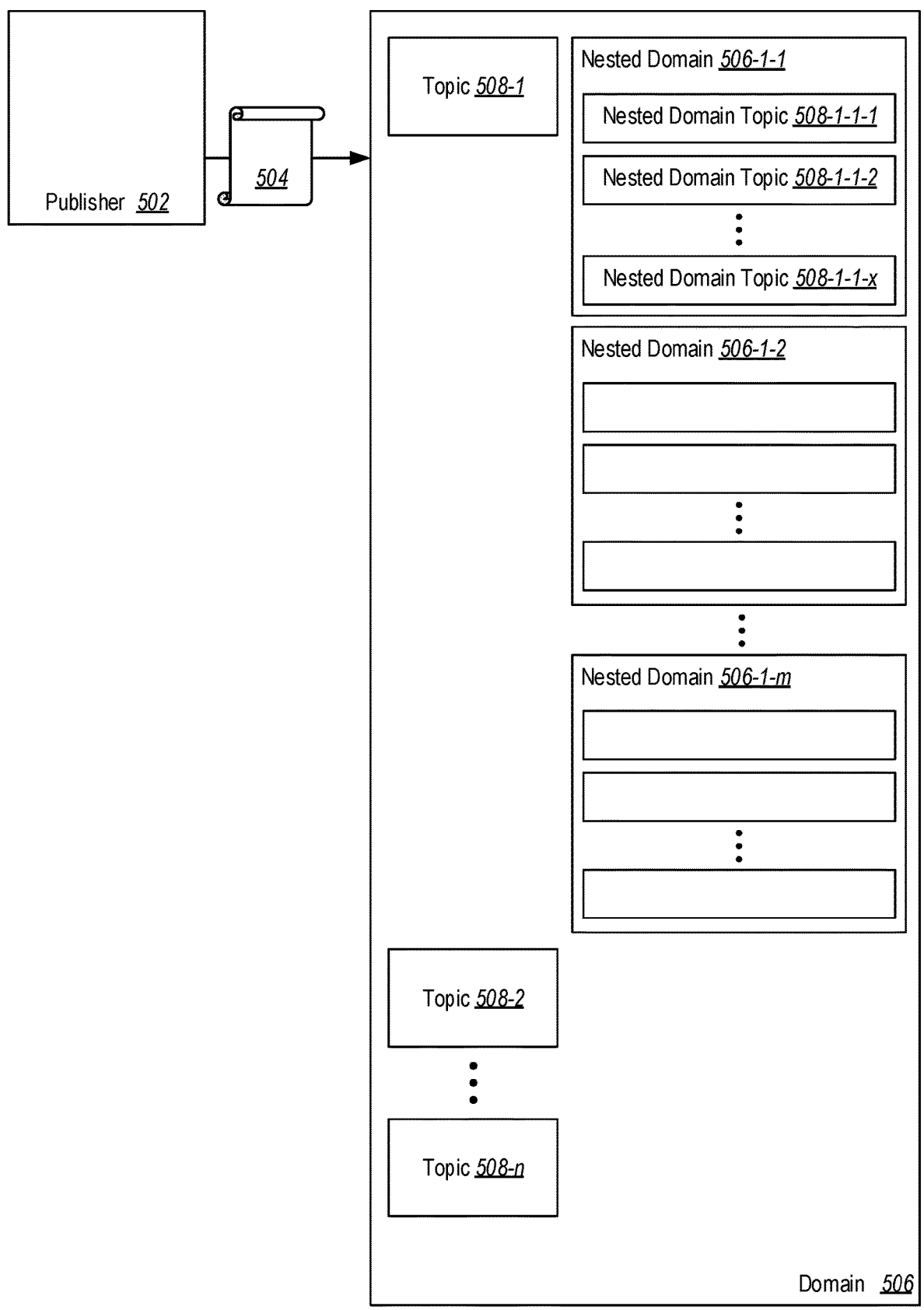
FIG. 5 illustrates a system for publishing event, the system having nested domains.

FIG. 5 illustrates yet another alternative embodiment. In the example illustrated in FIG. 5, the concept of nested domains is illustrated. In particular, it should be appreciated that domains can be implemented within another domain. For example, FIG. 5 illustrates a publisher 502 which publishes an event 504 to a domain 506. The domain includes a set of domain topics (i.e., domain topics 508-1 through 508-*n*, indicating any appropriate number of domain topics can be implemented).

In addition to containing domain topics 508-1 through 508-*n*, the domain 506 can also include nested domains, illustrated as nested domains 506-1-1 through 506-1-*m* (indicating any appropriate number of nested domains), each nested domain including nested domain topics.

In the illustrated example, nested domains typically correspond to a domain topic allowing subscribers to subscribe to nested domain topics within a nested domain for a domain topic. Thus, for example, nested domains 506-1-1, 506-1-2, through nested domain 506-1-*m* all receive events from the topic 508-1. In some embodiments, a given nested domain is only allowed to receive events from a single topic. However, in other embodiments, a given nested domain may receive events from a plurality of different topics. For example, the nested domain 506-1-1 could receive events from both the domain topic 508-1 and domain topic 508-2.

In an alternative or additional embodiment, a nested domain will receive the event 504 in a fashion similar to domain topics. For example, the event 504 may be addressed to a particular nested domain such that the event 504 does not need to pass through a particular domain topic before reaching the nested domain. For example, consider the following: A top level domain contains domain topics and other nested domains. A nested domain can contain domain topics and other nested domains. An event subscription can be created at the scope of: a top-level domain; a domain topic under a domain; a whole nested domain; a specific domain topic under a nested domain, etc.

For example, assume an insurance broker called Contoso handling insurance for multiple companies (referred to herein as Company1-Company10). Each of those companies has their own clients/customers such that the domains and topics are hierarchically organized as follows:

Contoso (Domain)
  Company 1 (nested domain)
    Customer11 (domain topic under nested domain)
    Customer12
    Customer13
  Company2
    Customer21
    Customer22
  Company3
  Company10

Event subscription can be created to the top-level domain, a topic under the top-level domain, a particular nested domain under the top-level domain, a particular domain topic under the nested domain, etc.

Each nested domain includes nested domain topics. For the current example shown in FIG. 5, only one set of nested domain topics is enumerated and discussed, but it should be appreciated that additional nested domain topics could be implemented. Returning once again to the present example, nested domain 506-1-1 includes nested domain topics 508-1-1-1, 508-1-1-2, through 508-1-1-*x*. Subscribers can subscribe to a given nested domain topic as illustrated above for domain topics. By nesting domains and domain topics, further limitations can be implemented on what events are available to subscribers.

Note that even further nested domains (with corresponding nested domain topics) could be implemented within nested domains. Thus, multiple levels of domains and domain topics could be implemented in certain embodiments.

Note that a nested domain may obtain events in a number of different fashions. For example, in one embodiment, the nested domain may receive an event from a domain topic. Thus, for example, the nested domains 506-1-1 through 506-1-*m* may be configured to receive events from the domain topic 508-1. Subscribers could then subscribe to nested topics, such that events could be delivered as appropriate to those subscribers.

Alternatively, as discussed above, nested domains will receive events in the same fashion as domain topics receive events. The events will not need to pass through a topic before being provided to a nested domain.

One could imagine that the nested domain functionality may be particularly useful in cloud computing environments where a tenant of the cloud computing environment has additional subtenants or customers. In this way a tenant of a cloud computing system can leverage resources from the cloud computing system to customers of the tenant. In particular, a tenant could receive events by subscribing to a particular domain topic, and could subdivide those events for customers of the tenant using nested domains and nested domain topics. Alternatively or additionally, nested domains and nested domain topics could be used to filter events, even at a cloud provider level.

The event processing service is configured to support various operations on domains. For example, embodiments may include various API's or other functionality for performing certain actions. For example, embodiments may provide functionality for creating a new domain. Alternatively or additionally, embodiments may provide functionality for deleting a domain. Alternatively or additionally, embodiments may provide functionality for updating a domain. Alternatively or additionally, embodiments may provide functionality for getting information about a domain. Alternatively or additionally, embodiments may provide functionality for listing all the domain topics under a domain. Alternatively or additionally, embodiments may provide functionality for listing the authorization keys for a domain. Alternatively or additionally, embodiments may provide functionality for regenerating the authorization keys for a domain.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
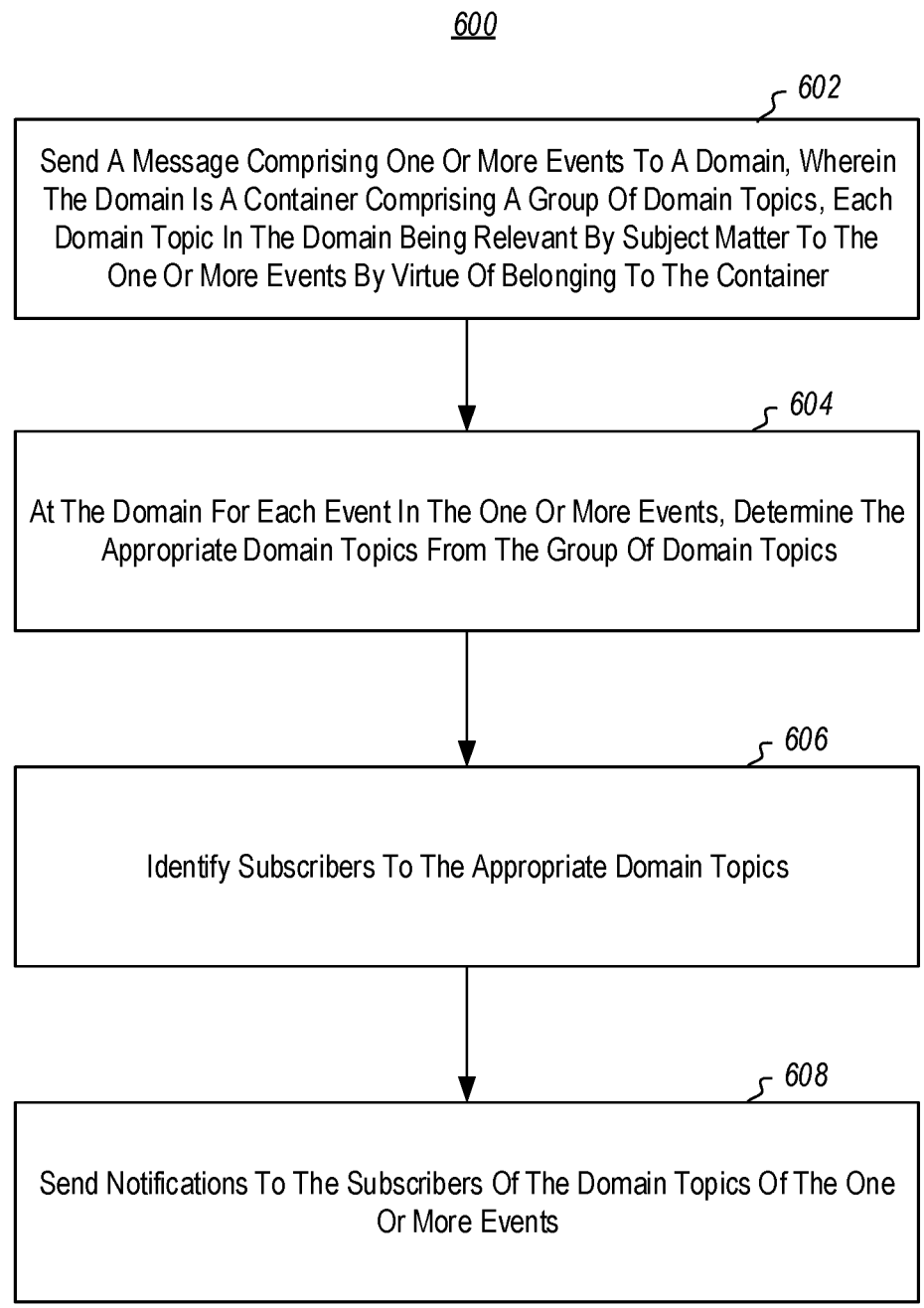
FIG. 6 illustrates a method of publishing events.

Referring now to FIG. 6, a method 600 is illustrated. The method 600 may be practiced in a computing environment and includes acts for providing event notifications. The method 600 includes a publisher sending a message comprising one or more events to a domain, wherein the domain is a container comprising a group of domain topics, each domain topic in the domain being relevant by subject matter to the one or more events by virtue of belonging to the container (act 602). Note that a given domain topic may be relevant to certain subscribers, but not to other subscribers. Alternatively or additionally, the domain topics are not in and of themselves relevant to the subject matter, other than being part of the domain that is relevant to the subject matter. Thus, for example, if a domain topic were moved to a different domain, it would be relevant to a different subject matter by being in the different domain.

The method 600 further includes, at the domain determining the appropriate domain topics for each event in the one or more events from the group of domain topics (act

604). For example, the domain can examine a message containing routing information which routes events to domain topics.

The method 600 further includes identifying subscribers to the appropriate domain topics (act 606).

The method 600 further includes sending notifications to the subscribers of the domain topics of the one or more events (act 608).

The method 600 may be practiced where the message comprises a plurality of events for a single domain topic.

The method 600 may be practiced where the message comprises a plurality of events, each of the events in the plurality of events being for a different domain topic.

The method 600 may be practiced where the message explicitly identifies appropriate domain topics for events. Alternatively, embodiments may be able to use event payload context, machine learning, and/or other modalities to determine event routing to domain topics.

The method 600 may be practiced where the domain is included in a set of nested domains.

The method 600 may be practiced where identifying subscribers to the appropriate domain topics comprises identifying a subscription at the domain level, and wherein sending notifications to the subscribers of the domain topics comprises sending notifications to the subscriber at the domain level based on the subscription being a domain level subscription.

The method 600 may be practiced where identifying subscribers to the appropriate domain topics comprises identifying subscriptions, but with certain filters specified, such that sending notifications to the subscribers comprises only sending notifications that meet criteria of the specified filters.

The method 600 may further include automatically creating a domain topic in the domain as a result of a component attempting to subscribe to the domain topic when the domain does not yet include a domain topic for the subscription in the domain.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to provide event notifications to a plurality of tenants while maintaining isolation between the tenants by allowing tenants to only subscribe to domain topics associated with the tenants, including instructions that are executable to configure the computer system to perform at least the following:
   authenticating a publisher to a domain with a single authentication enabling the publisher to send a batch of events to the domain, the batch of events comprising events directed to different domain topics;
   receiving from the publisher at the domain the batch of events, wherein the domain comprises a group of domain topics, each domain topic in the domain being related by subject matter by virtue of belonging to the domain;
   at the domain determining appropriate domain topics, for each event in the batch of events, from the group of domain topics;
   identifying subscribers to the appropriate domain topics, wherein at least one subscriber to a domain topic is permitted to subscribe to a certain domain topic associated with a tenant while being prevented from subscribing to other domain topics, associated with other tenants, in the domain; and
   sending a notification to the subscriber of the certain domain topic of one or more events, from the batch of events, for the certain domain topic, while preventing other notifications of events for the batch of events, for different domain topics from being sent to the subscriber.

2. The computer system of claim 1, wherein the batch of events comprises a plurality of events for a single domain topic.

3. The computer system of claim 1, wherein the batch of events comprises a plurality of events, each of the events in the plurality of events being for a different domain topic.

4. The computer system of claim 1, wherein the batch of events explicitly identifies appropriate domain topics for events.

5. The computer system of claim 1, wherein the domain is included in a set of nested domains.

6. The computer system of claim 1, wherein identifying subscribers to the appropriate domain topics comprises identifying a subscription at the domain level, and wherein sending notifications to the subscribers of the domain topics comprises sending notifications to the subscriber at the domain level based on the subscription being a domain level subscription.

7. The computer system of claim 1, wherein identifying subscribers to the appropriate domain topics comprises identifying subscriptions, but with certain filters specified, such that sending notifications to the subscribers comprises only sending notifications that meet criteria of the specified filters.

8. The computer system of claim 1, wherein the one or more computer-readable media further have stored thereon instructions that are executable by the one or more processors to configure the computer system to automatically create a domain topic in the domain as a result of a subscriber attempting to subscribe to the domain topic.

9. A method of efficiently providing event notifications to a plurality of tenants while maintaining isolation between the tenants by allowing tenants to only subscribe to domain topics associated with the tenants, the method comprising:
   authenticating a publisher to a domain with a single authentication enabling the publisher to send a batch of events to the domain, the batch of events comprising events directed to different domain topics;
   receiving from the publisher at the domain the batch of events, wherein the domain comprises a group of domain topics, each domain topic in the domain being related by subject matter by virtue of belonging to the domain;
   at the domain determining appropriate domain topics, for each event in the batch of events, from the group of domain topics;
   identifying subscribers to the appropriate domain topics, wherein at least one subscriber to a domain topic is permitted to subscribe to a certain domain topic associated with a tenant while being prevented from subscribing to other domain topics, associated with other tenants, in the domain; and
   sending a notification to the subscriber of the certain domain topic of one or more events, from the batch of events, for the certain domain topic, while preventing other notifications of events for the batch of events, for different domain topics from being sent to the subscriber.

10. The method of claim 9, wherein the batch of events comprises a plurality of events for a single domain topic.

11. The method of claim 9, wherein the batch of events comprises a plurality of events, each of the events in the plurality of events being for a different domain topic.

12. The method of claim 9, wherein the batch of events explicitly identifies appropriate domain topics for events.

13. The method of claim 9, wherein the domain is included in a set of nested domains.

14. The method of claim 9, wherein identifying subscribers to the appropriate domain topics comprises identifying a subscription at the domain level, and wherein sending notifications to the subscribers of the domain topics comprises sending notifications to the subscriber at the domain level based on the subscription being a domain level subscription.

15. The method of claim 9, wherein identifying subscribers to the appropriate domain topics comprises identifying subscription at the domain level, but with certain filters specified, such that sending notifications to the subscribers of the domain topics comprises only sending notifications that meet criteria of the specified filters.

16. The method of claim 9, further comprising automatically creating a domain topic in the domain as a result of a subscriber attempting to subscribe to the domain topic.

17. A computer system for providing event notifications to a plurality of tenants while maintaining isolation between the tenants, the computer system comprising one or more processors and one or more computer readable media comprising instructions that when executed by the one or more processors are configured to implement:

an event publisher configured to authenticate the publisher to a domain, with a single authentication, enabling the publisher to publish a batch of events to the domain, the batch of events comprising events directed to different domain topics;

the domain coupled to the event publisher, wherein the publisher is configured to receive from the publisher the batch of events and to publish events to the domain; and a plurality of domain topics in the domain, each domain topic in the domain being related by subject matter by virtue of belonging to the domain, each domain topic being configured to notify subscribers to the domain topic of events, from the batch of events, and wherein the domain is configured to route events to domain topics within the domain, wherein at least one subscriber to a domain topic is permitted to subscribe to a certain domain topic associated with a tenant while being prevented from subscribing to other domain topics, associated with other tenants, in the domain.

18. The computer system of claim 17, wherein the domain is included in a set of nested domains.

19. The computer system of claim 17, wherein the domain is configured to allow some subscribers to subscribe to the domain, such that subscribers at the domain are automatically subscribed to all of the domain topics in the domain.

20. The computer system of claim 17, wherein the domain is configured to automatically create domain topics in the domain when subscribers attempt to subscribe to domain topics not yet included in the domain.

* * * * *